United States Patent [19]

Okumura

[11] 4,343,709

[45] Aug. 10, 1982

[54] METHOD AND DEVICE FOR SEPARATELY COLLECTING AND DISCHARGING COMPONENTS OF LIQUID IN CENTRIFUGAL ROTOR

[75] Inventor: Akira Okumura, Takarazuka, Japan

[73] Assignees: Tetsuo Matsumoto; Eiko Okumura, both of Hyogo, Japan

[21] Appl. No.: 214,651

[22] Filed: Dec. 9, 1980

[30] Foreign Application Priority Data

Dec. 28, 1979 [JP] Japan ............................... 54-172111

[51] Int. Cl.$^3$ .............................................. B01D 21/26

[52] U.S. Cl. ................................ 210/782; 210/512.1; 210/927; 233/26; 233/47 R; 435/312

[58] Field of Search ..................... 210/782, 927, 512.1, 210/781; 233/26, 27, 46, 47 R; 435/312; 422/73

[56] References Cited

U.S. PATENT DOCUMENTS 3,801,004 4/1974 Martin .................................. 233/26

3,864,089 2/1975 Tiffany et al. ........................ 233/26

4,278,202 7/1981 Westberg ........................... 210/927

*Primary Examiner*—Benoît Castel

*Attorney, Agent, or Firm*—Brumbaugh, Graves, Donohue & Raymond

[57] ABSTRACT

Method and device for centrifugal separation of components of a liquid in which the liquid components are separated under the action of centrifugal force and then separately collected and discharged under the action of syphon mechanism.

3 Claims, 4 Drawing Figures

METHOD AND DEVICE FOR SEPARATELY COLLECTING AND DISCHARGING COMPONENTS OF LIQUID IN CENTRIFUGAL ROTOR

The present invention relates to an improvement in a method and a device for separately or compositely collecting and completely discharging components of a liquid in a centrifugal rotor.

In analysis and measurement of liquid components in a vessel which have been separated under centrifugal action in a centrifugal rotor, it is necessary to separately collect such liquid components, and it is also necessary to completely discharge the separated liquid remaining in a container to the outside therof and to wash the inside of said container, in order to prepare for the succeeding separating step.

In the conventional centrifugal rotor, however, the separate collecting and discharging treatment has not been effected in completely satisfactory manner, and even almost all of modern automatic separate collecting and discharging processes, which have been recently developed, necessarily adopt some types of additional mechanical means, resulting in complication of the additional construction of the centrifugal rotor, increase of cost and increase of failures during operation.

The present invention aims at eliminating the disadvantages in the conventional processes as described above and providing a processing for separately collecting and discharging liquid components in a centrifugal rotor in very smooth and reliable manner, without using additional mechanical means. For example, the present invention provides a method for separately collecting and discharging components of a liquid in a centrifugal rotor in which a container having a syphon mechanism formed therein is arranged in said centrifugal rotor, with its bottom being directed in the direction of centrifugal force, said method comprising pouring the liquid into said container while rotating said centrifugal rotor to separate the liquid components and then further pouring the liquid into the container to upwardly move the liquid level, whereby the components of the liquid are separately collected and discharged in automatic manner under the syphon action of said syphon mechanism.

Figure 1:
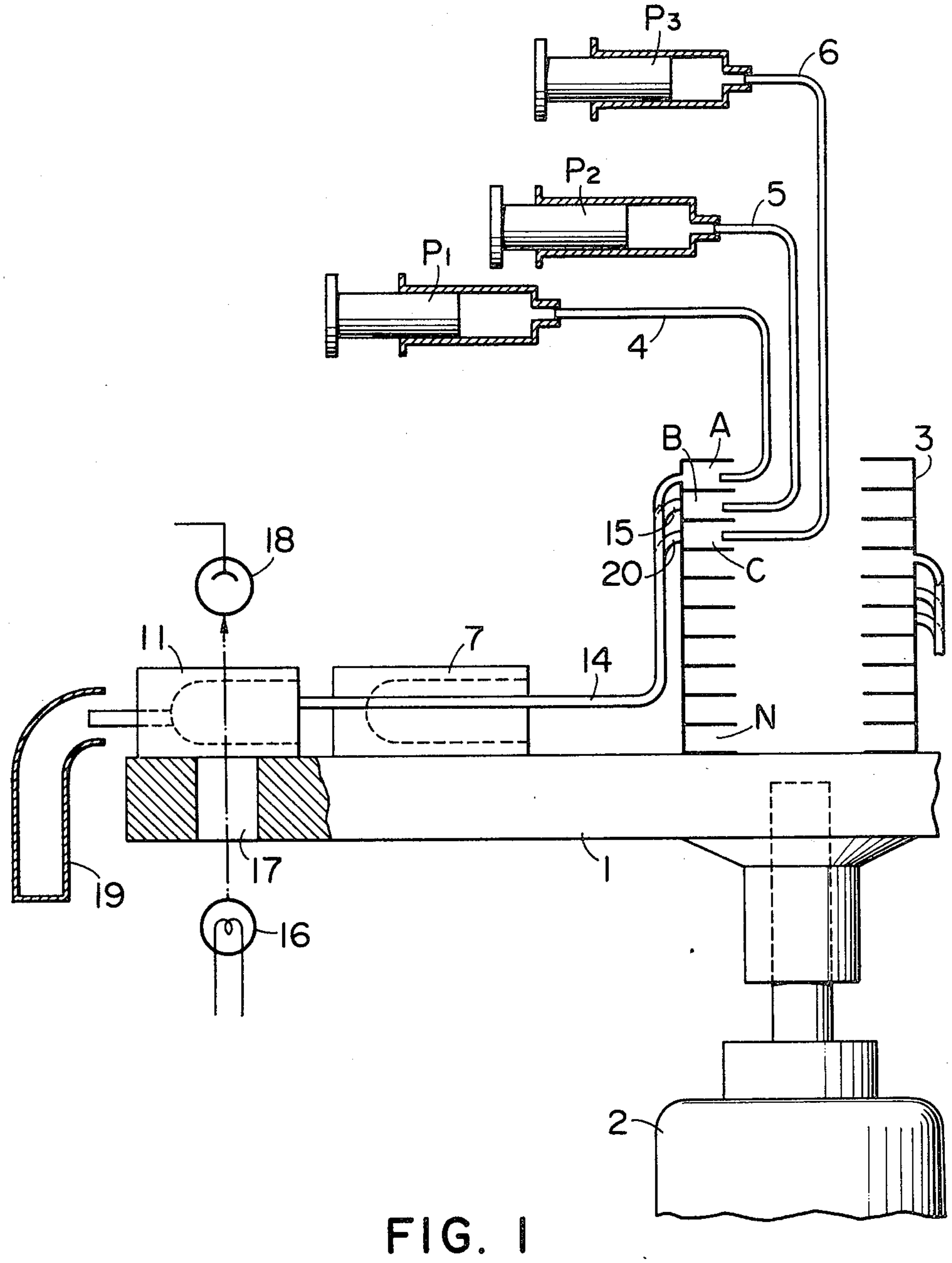
Figure 2:
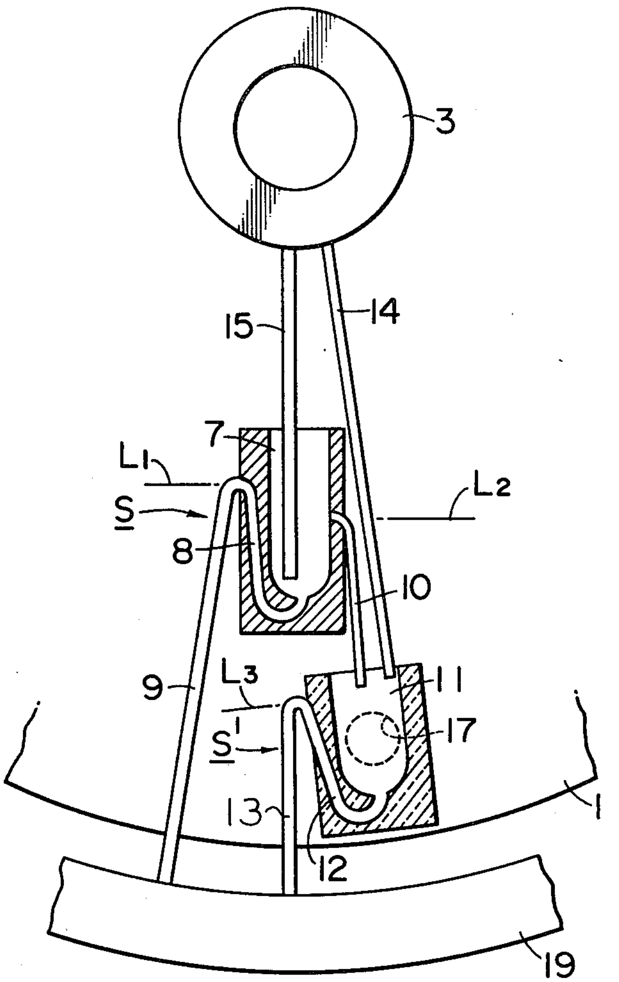
Figure 3:
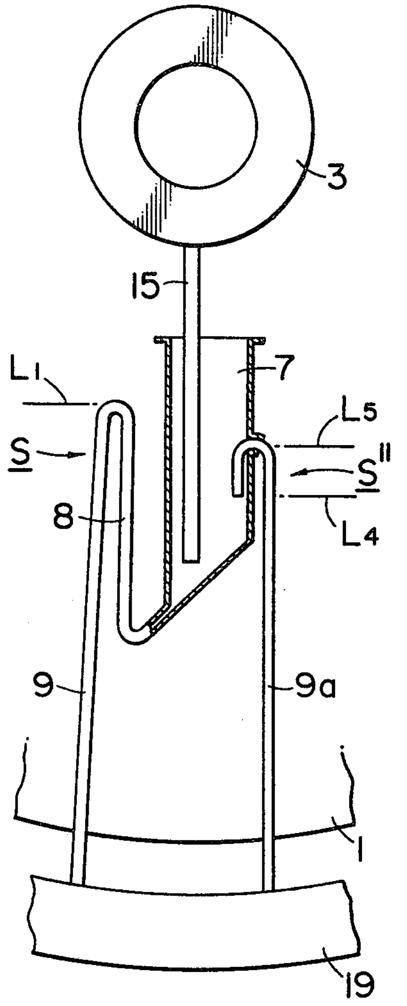
Figure 4:
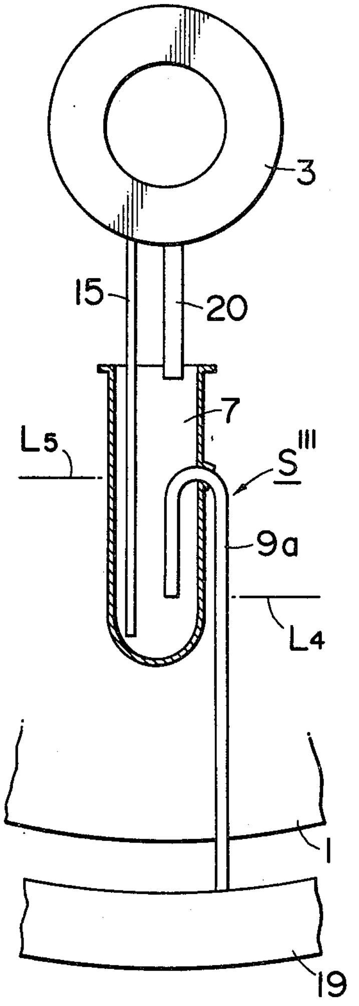

Now the invention will be explained with reference to the drawings which illustrate the embodiments of the invention in which FIG. 1 is a front view, partly broken, of a device used in the first embodiment, FIG. 2 is a plan view thereof, FIG. 3 and 4 are views showing only essential parts of the device used in the second and third embodiments, respectively.

FIRST EMBODIMENT

FIGS. 1 and 2 illustate the first embodiment of the invention, which includes a centrifugal rotor 1 driven by a motor 2, a cylindrical liquid receiver 3 formed on the center of the upper surface of said centrifugal rotor and having a plurality of stages of annular liquid receiving sections A, B, C–N, liquid pouring pipes 4, 5 and 6 extending from liquid pouring pumps $P_1$, $P_2$ and $P_3$ and directed, at their forward ends to said liquid receiving sections A, B and C of the above liquid receiving sections, respectively, a container 7 arranged on the top surface of said centrifugal rotor, said container having an upper opening portion directed toward the center of said rotor and a bottom directed in the direction of centrifugal force, a syphon mechanism S formed by a passage 8 extending from the bottom-most portion of said container 7 to the upper portion $L_1$ thereof along a curved path through the wall of said container 7 and a liquid discharging pipe 9 connected to said passage 8, and an overflow pipe 10 extending from substantially middle portion $L_2$ of the side wall of said container 7 to the outside thereof.

The device further includes a measuring container 11 for determining the liquid components fixed on the upper surface of said rotor 1 at the position near the outer periphery thereof, which is arranged in the similar manner as in the container 7, and another syphon mechanism S' formed by a passage 12 extending in the same manner as in the above mentioned passage to the top position $L_3$ and a liquid discharging pipe 13, said overflow pipe 10 connected to the container 7 extending, at its forward end, into the upper portion of said measuring container 11, said liquid pouring pipe 4 connected to said liquid pouring pump $P_1$ communicating through a liquid feeding pipe 14 with said measuring container 11, and said liquid pouring pipe 5 connected to the liquid pouring pump $P_2$ communicating through a liquid feeding pipe 15 with the bottom portion of the container 7.

The measuring container 11 is made of transparent material and a light source 16 is arranged to emit a light beam which is passed through an opening 17 formed in the rotor and the measuring container 11 and then received by a detector 18 which acts to measure the light beam thus received. A receptacle 19 for receiving the discharged liquid is arranged at the outside of the rotor.

The device as constructed above is used to effect centrifugal separation of components of a human blood. The rotor 1 is driven at 2000 rpm and 2.0 ml of the human blood including a very small amount of heparin added thereto is fed from the pouring pump $P_2$ through the pipes 5 and 15 into the container 7. The centrifugal separating treatment is effected for 5 min., while the liquid level is held at the level lower than the position of $L_2$. Then 0.5 ml of a liquid having higher specific gravity such as silicon liquid, saline solution, sugar solution, or the same blood is additionally fed through the pipes 5 and 15 into the same container. By such pouring operation, 0.2 ml of supernatant liquid of the sample liquid in the container 7 which has been subjected to the centrifugal separation overflows through the overflow pipe 10 into the liquid component measuring container 11. At the same time as to additional pouring of liquid as described above, 1.8 ml of a buffer solution of pyrophosphoric acid (pH 8.3, 0.1M) including nicotinamide dinucleotide ($10^{-3}$M) and pyruvic acid ($10^{-3}$M) is fed from the puring pump $P_1$ through the pipes 4 and 14 into the measuring container 11. The liquid thus fed from the pump $P_1$ is mixed with the above-mentioned overflown liquid (sample liquid) in the measuring container 11, and the nicotinamide dinucleotide in said pyrophosphoric acid buffer solution is reduced under the action of lactate dehydrogenase contained in the blood. The reaction velocity of such reduction is automatically measured in accordance with the variation of 340 nm light passing from the light source 16 positioned outside of the rotor through the opening 17 to the detector 18, and the activity of the lactate dehydrogenase in the blood (blood plasma) is measured in accordance with the change of the light absorption with the passage of time.

After the measurement, large amounts, about 20 ml each, of water are poured through the pipes 5, 15 and 4, 14 into the container 7 and the measuring container 11, respectively, so that the both containers are refilled with the liquid. When the liquid level in the container 7 comes beyond the position of $L_1$, the liquid in said container is automatically and completely discharged through the passage 8 and the pipe 9 into the receptacle 19 positioned outside of the rotor under the syphon action of the syphon mechanism S formed in said container. Also in case of the measuring container, when the liquid level comes beyond the position of $L_3$, the liquid in said measuring container is automatically and completely discharged through the passage 12 and the pipe 13 into the receptacle 19 in the same manner, as in the above container, under the syphon action of the syphon mechanism S' formed in said measuring container. Thus the both containers 7 and 11, and the pipes and the passages disposed around and connected to these containers are completely washed, in order to prepare for the centrifugal separation of new liquid components and the measurement of the separated liquid components.

SECOND EMBODIMENT

FIG. 3 illustrates the second embodiment of the present invention, in which the measuring container arranged on the rotor in the first embodiment is omitted, some modification is included in the container 7 of the first embodiment, and there is provided an additional syphon mechanism S'' in the container 7 for separate collection in place of the overflow pipe of the container 7 in the first embodiment. More particularly, in addition to the syphon mechanism S formed by the passage 8 extending from the bottom of the container 7 to the upper portion thereof along a curved path and the liquid discharging pipe 9 connected thereto, there is provided another syphon mechanism S'' for separate collection of a centrifugally separated liquid component. The syphon mechanism S'' is formed by a separate collection pipe 9*a* which is inserted to a desired middle position $L_4$ into the container 7 and which passes through the container at the upper position $L_5$, namely at the level substantially midway between the positions $L_1$ and $L_4$, to the outside of the container and extends to the outside of the rotor.

In opearation, the rotor 1 is driven at 2000 rpm, and 2.0 ml of the human blood including a very small amount of heparin added thereto is poured into the container 7 in the same manner as in the first embodiment. The centrifugal separation is effected for 5 min., while the liquid level is held at the level lower than $L_5$. Then, 0.3 ml of a liquid having higher specific gravity such as silicon liquid, saline solution, sugar solution, or the same blood is additionally fed into the container. By such additional pouring the liquid levels comes beyond the position of $L_5$, the supernatant liquid is discharged and separately collected from the position of $L_4$ through the pipe 9*a* to the outside of the rotor under the action of the syphon mechanism S'' for separate collection. Nextly, large amount, about 20 ml of water is poured into the container in the same manner as in the first embodiment. When the liquid level comes beyond the position of $L_1$, the liquid in the container is automatically and completely discharged to the outside of the rotor in the same manner as in the first embodiment, whereby the required washing is effected to prepare for another centrifugal separation.

In the second embodiment, the separate collection is effected by discharging the liquid to the outside of the rotor, but it is possible to provide another container in the rotor, in the same manner as in the first embodiment, to separately collect the liquid by said container to effect the liquid component measuring operation or the like.

It will be understood from the above description that this embodiment aims at compositely effecting the operation of separate collection of the sample separated by the centrifugal separation and the washing operation of the inside of the container or the like under the action of two syphon mechanisms.

THIRD EMBODIMENT

FIG. 4 illustrates the third embodiment of the invention which is constructed to effect only separate collection of the sample separated by the centrifugal action. This embodiment is different from the second embodiment, only in the points that the syphon mechanism arranged on the rotor to completely discharge the liquid is omitted and that the liquid feeding pipe 6 connected to the liquid pouring pump $P_3$ positioned outside of the rotor is connected through a liquid feeding pipe 20 to the vicinity of the opening portion of the container 7. The other constructions, namely that of the syphon mechanism S''' for separate collection or the like are same as those shown in the second embodiment.

In operation, the rotor 1 is driven at 2000 rpm, and 5 ml of the human blood which has been diluted to two times of volume by physiological saline solution is poured from the pump $P_2$ through the pipe 5 and 15 into the container 7, and the centrifugal separation is effected for 3 min, while holding the liquid level at the position lower than $L_5$. Then 0.5 ml of saline solution is additionally poured through the liquid feeding pipe 20 into the container. Thus the liquid level comes beyond the position of $L_5$ and 4 ml of the supernatant liquid higher than the position of $L_4$ is separately collected and discharged through the pipe 9*a* to the outside of the rotor. Then 3.5 ml of physiological saline solution is poured again through the liquid feeding pipe 15 into the container and the centrifugal separation is effected for 3 min, while holding the liquid level at the position lower than $L_5$.

After such centrifugal separation, 0.5 ml of saline solution is additionally poured through the pipe 20, then the supernatant liquid positioned above the position of $L_4$ is separately collected and discharged to the outside of the rotor under the action of the syphon mechanism S''' for separate collection, in the same manner as described above. By repeating such operation it is possible to easily and automatically obtain red blood cells washed by physiological saline solution.

It will be understood from the above description that the present invention enables to automatically and reliably effect the separate collection and desired measurement of the liquid to be measured, which has been poured into a centrifugal separating container positioned on a rotor and separated thereby, under the syphon action, and further enables to automatically effect the complete discharging of liquid remaining in the container and washing of the inside of the container or the like (including the pipes arranged around the container), under the syphon action. The operation of separation collection and the operation of discharging can be effected in independently or compositely, and in composite operation it is possible to intermittently or continuously effect the separate collection and the measurement at high efficiency. Furthermore, the invention enables to achieve the separate collection and discharging in very economical, safe and reliable manner, without requiring the additional mechanical means other than those required to rotate the rotor at the time of separate collecting and discharging operation.

The present invention can be applied to the construction in which liquid is separately fed into a plurality of containers arranged in a rotor, and the liquids in the respective containers are separately collected, under the action of syphon mechanisms of the respective containers, into a specific container arranged on the rotor, where the respective liquids are mixed together, whereby efficient mixing effect can be obtained.

It will be understood to those skilled in the art that geometries of the syphon mechanism and the container and the arrangement of the several components on the rotor shown in the drawings can be readily implemented with commercially available components or can be easily implemented utilizing standard text book knowledge since the function of each component has been set forth.

Having thus described my invention, I claim:

1. A method for separating components of a liquid and separately collecting one said components in a continuously rotating centrifuge device having a rotor, a first container for holding a liquid sample, a second container disposed radially outward of said first container, said containers arranged for rotation with said rotor, each said container having a radially outer end, and a cylindrical liquid receiver mounted at the center of said rotor for rotation therewith, said receiver having a plurality of discrete annular sections, comprising the steps of:

rotating said centrifuge device;

introducing a liquid sample into an annular section of said liquid receiver and from said receiver into said first container;

holding said sample in said first container for a sufficient time to separate said liquid sample into components, including a supernatant, under centrifugal action;

withdrawing a predetermined portion of the supernatant through an overflow pipe having one end opening in said first container at a distance from said outer end, wherein the withdrawing step is effected by introducing additional liquid into an annular section of said liquid receiver, and from said receiver into said first container while said centrifuge device is rotating to cause said predetermined portion to flow out said overflow pipe;

collecting said predetermined portion of the supernatant, withdrawn through said overflow pipe while said centrifuge device is rotating, in the rotating second container for analysis;

introducing another liquid into an annular section of said liquid receiver and from said receiver into the rotating second container for mixing with said predetermined portion, wherein said liquid sample and the said other liquid are introduced into said receiver and thereafter into said first and second containers, respectively, through independent liquid flowstreams, each communicating with a separate source of liquid and having a liquid feeding pipe arranged for delivering fluid to an annular section of said liquid receiver;

optically measuring the mixed liquids while holding said mixed liquids in the rotating second container; and introducing a washing liquid into at least one annular section of said receiver, and from said receiver into said rotating first and second containers, and withdrawing said washing liquid through a syphon associated with each container to flush said containers, in which each syphon has a first conduit portion communicating with, and extending radially inwardly from, the outer end of the respective container, a second conduit portion extending radially outwardly, and a bend portion connecting the first and second conduit portions, in which the bend portion is disposed radially inwardly of the said one end of the overflow pipe, wherein said predetermined portion is caused to flow out said outlet pipe by introducing said additional liquid to a level below the respective syphon bend, and wherein the flushing is effected by introducing a quantity of said washing fluid to a level higher than each said bend to actuate the syphons.

2. A method as defined in claim 1, wherein said overflow pipe has a first pipe portion extending radially inwardly from said one end, a second pipe portion extending radially outwardly to said second container, and a bend portion for connecting said first and second pipe portions, wherein said liquid sample is introduced into said first container to a level below the bend portion of said pipe, and wherein the withdrawing step is effected by introducing a quantity of said additional liquid to a level higher than said bend to cause said predetermined portion to be syphoned from said first container into said outlet pipe.

3. A centrifuge device for separating components of a liquid and separately collecting one said component, said device comprising:

(a) a rotor;

(b) a first container mounted for a rotation with said rotor;

(c) a second container mounted for rotation with said rotor and disposed radially outward of said first container, each said container having a radially outer end;

(d) means associated with said rotor for introducing liquid into said containers, while said rotor is rotating, including:

a cylindrical liquid receiver mounted at the center of said rotor for rotation therewith, said receiver having a plurality of discrete annular sections, a plurality of liquid pouring pipes having outlets directed at separate ones of said sections for introducing liquid into said liquid receiver, and conduit means having a first conduit communicating between at least one annular section and said first container and having an outlet disposed in said first container near said outer end, and a second conduit communicating between another annular section and said second container;

(e) means for withdrawing a predetermined portion of supernatant of said sample while said rotor is rotating and for collecting said supernatant is said second container comprising an overflow tube having one end opening in said first container at a distance from its outer end and communicating with said second container; and (f) syphon means associated with each container for withdrawing liquid therefrom, each comprising a first conduit portion communicating with and extending radially inwardly from the outer end of the respective container, a second conduit portion extending radially outwardly, and a bend portion connecting said conduit portions, wherein the bend portion of the syphon associated with said first container is disposed radially inward of said overflow tube one end, and wherein a washing liquid may be introduced from a pouring pipe and delivered to both said cylinders, and said syphon means will act to withdraw the washing liquid to flush said containers.

* * * * *